(12) United States Patent
Roux et al.

(10) Patent No.: US 10,787,962 B2
(45) Date of Patent: Sep. 29, 2020

(54) ACTIVE SYSTEM GENERATING DESTRUCTIVE ACOUSTIC INTERFERENCE FOR AN AIRCRAFT ENGINE WITH MULTIPLE FAN SPOOLS

(71) Applicant: Safran Aircraft Engines, Paris (FR)

(72) Inventors: Jean Michel Roux, Moissy-Cramayel (FR); Norman Bruno André Jodet, Moissy-Cramayel (FR); Laurent Louis Robert Baudoin, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 129 days.

(21) Appl. No.: 16/050,039

(22) Filed: Jul. 31, 2018

(65) Prior Publication Data

US 2019/0063314 A1 Feb. 28, 2019

(30) Foreign Application Priority Data

Aug. 1, 2017 (FR) ...................................... 17 57366

(51) Int. Cl.
*F02K 3/00* (2006.01)
*F02C 3/107* (2006.01)
*F02C 7/045* (2006.01)
*B64D 29/00* (2006.01)
(Continued)

(52) U.S. Cl.
CPC .............. *F02C 3/107* (2013.01); *B64D 29/00* (2013.01); *B64D 33/02* (2013.01); *F02C 7/045* (2013.01);
(Continued)

(58) Field of Classification Search
CPC .. F02K 3/06; F02K 3/077; F02C 7/042; F02C 7/045; F02C 7/057; B64D 2033/0206; B64D 2033/0226
See application file for complete search history.

(56) References Cited

U.S. PATENT DOCUMENTS 3,611,724 A * 10/1971 Kutney ................... F02C 7/042
60/226.1
4,044,203 A   8/1977 Swinbanks
(Continued)

FOREIGN PATENT DOCUMENTS

EP        1 607 603 A2   12/2005
EP        1 992 810 A2   11/2008
GB        2544625 A       5/2017

OTHER PUBLICATIONS

Search Report dated Apr. 30, 2018 in French Patent Application No. 1757366, 9 pages (with English translation of categories of cited documents).

*Primary Examiner* — Gerald L Sung
(74) *Attorney, Agent, or Firm* — Oblon, McClelland, Maier & Neustadt, L.L.P.

(57) ABSTRACT

An aircraft propulsion unit including two distinct fan spools, and including a first duct and a second duct extending downstream of the two fan spools, the propulsion unit including a control ring disposed on one of the ducts, downstream of one of the fan spools, with at least one annular internal wall extending in an interior space of the duct, the control unit of the control ring being configured to modify the shape of the internal wall, and to cause an air passage cross section in the duct to vary at the ring, a device for acquiring acoustic signals generated by acoustic waves propagating downstream of the fan spools, and a device for processing the acoustic signals, configured to measure a dephasing between the acoustic waves and to control the control ring depending on the dephasing.

13 Claims, 6 Drawing Sheets

(51) Int. Cl.
    *G10K 11/16*     (2006.01)
    *B64D 33/02*     (2006.01)
    *F02K 3/06*     (2006.01)
    *B64D 27/10*     (2006.01)

(52) U.S. Cl.
    CPC ............... F02K 3/06 (2013.01); G10K 11/16 (2013.01); B64D 27/10 (2013.01); B64D 2033/0206 (2013.01); F05D 2260/96 (2013.01); F05D 2270/333 (2013.01); F05D 2270/81 (2013.01)

(56) References Cited

U.S. PATENT DOCUMENTS

| | | | | |
|---|---|---|---|---|
| 4,155,221 A | * | 5/1979 | Dhoore | F04D 29/681 415/119 |
| 5,478,199 A | * | 12/1995 | Gliebe | B64D 33/02 415/119 |
| 6,089,505 A | * | 7/2000 | Gruensfelder | B64D 33/02 137/15.1 |
| 2004/0025493 A1 | * | 2/2004 | Wojciechowski | F02K 3/06 60/224 |
| 2005/0274103 A1 | | 12/2005 | Prasad et al. | |
| 2007/0163229 A1 | | 7/2007 | Prasad et al. | |
| 2008/0283676 A1 | | 11/2008 | Jain et al. | |
| 2009/0060704 A1 | * | 3/2009 | Hurwitz | B64D 33/02 415/1 |
| 2009/0229243 A1 | * | 9/2009 | Guemmer | B64D 27/12 60/226.1 |
| 2010/0011741 A1 | * | 1/2010 | Babu | F01D 13/003 60/226.1 |
| 2010/0215479 A1 | | 8/2010 | Prasad et al. | |
| 2019/0017439 A1 | * | 1/2019 | Riou | F02C 7/045 |

* cited by examiner

ACTIVE SYSTEM GENERATING DESTRUCTIVE ACOUSTIC INTERFERENCE FOR AN AIRCRAFT ENGINE WITH MULTIPLE FAN SPOOLS

TECHNICAL FIELD OF THE INVENTION AND PRIOR ART

The present invention pertains to the field of turbine engines for an aircraft propulsion unit.

In all the following, particular interest will be taken in turbojets with double flow having an architecture with multiple fan spools, of the "multifan" type. This architecture, which uses the principle of distributed propulsion, is shown in the appended FIG. 1. The turbojet 1, designed with a multifan architecture and having an axis of revolution A, is a two-spool turbojet provided with an HP (high pressure) spool comprising an HP compressor 5 and an HP turbine 6, as well as a BP (low pressure) spool comprising a BP compressor 7 and a BP turbine 8, and a combustion chamber 3.

The turbine 8 drives not only a single fan rotor, but two distinct fan rotors 2a and 2b, with axes parallel to the axis A, having two separate downstream, non-coaxial ducts. The rotors 2a and 2b are joined to the BP spool by a transmission system 4. The front surfaces of the rotors 2a and 2b are substantially contained in the same plane perpendicular to the axis A, shown by the plane P in FIG. 1.

The advantage of this type of architecture is to allow an increase in the bypass ratio (BPR) of the turbojet and therefore its thermodynamic efficiency, by bypassing the technical and operational constraints connected with an increase in diameter of a single fan spool such as the fan blade tip speed, or the ground clearance.

For such engines, however, the problem of reducing the noise generated by the aerodynamic elements of a turbojet during its operation, which can be called "engine noise". In particular, the assembly consisting of the fans and the outlet guide vanes (OGV) contributes considerably to the engine noise. The engine noise propagates both upstream and downstream of these elements. Solutions are sought for attenuating the pressure fluctuations generated by these elements, without considerable impacts on mechanical bulk, mass or energy consumption of the system.

One well-known solution consists of installing anti-noise "honeycomb" panels in the interior of the nacelle of a turbojet, where a perforated metal sheet separates the interior of the structure from the air flow. However, the effectiveness of such a treatment is optimal only for a relatively limited range of frequencies, depending on the design of the panels used.

The treatment surface being more and more limited by the dimension of the nacelle, it has also been proposed to exploit destructive interference phenomena between the acoustic waves downstream of the fan spools. This interference phenomenon, illustrated schematically in the appended FIG. 2, occurs when two signals emanating from distinct sources are superimposed at a point. In the case where the two signals have identical shapes and amplitudes, one of the signals being in phase opposition with the second as are signals T0 and T1 shown in FIG. 2, it is possible to obtain in the resultant T2 a cancellation of the noise. The compression generated by one of the waves is then compensated by the expansion associated with the second. In the case where the two waves are not exactly in phase opposition, it is still possible to get a resultant sound wave with a much lower amplitude, and thus to attenuate the noise generated by the system.

Patent application FR2998267 in the Applicant's name proposes, for reducing the noise of the fan of an engine, a device inspired from the already known concept of an HQ tube, or Herschel-Quincke tube (a hollow curved tube constituting a parallel deviation for the air flows, in a duct in which an acoustic wave circulates). The HQ tube can be disposed in an air duct of a turbojet equipped with a honeycomb panel on its surface, and pass through the thickness of the honeycomb panel to lead at both its ends to the interior of the duct. A pressure fluctuation acoustic signal is thus extracted in the duct and reinjected at another point with dephasing designed for the attenuation of the noise generated by this acoustic signal. The reinjected signal accomplishes destructive interference with the non-dephased signal on which it is superimposed. In particular, due to the fact that the acoustic signal is not reinjected at the extraction location, it does not allow a guarantee of sufficient similitude to obtain significant attenuation by destructive interference. On the other hand, the dephasing obtained depends on the size of the HQ tube, which imposes being able to adapt the length of the tube depending on the speed of the fan spools. For this reason, this system of passive control has optimal effectiveness only for a single operating point of the engine.

Patent application FR2968048 in the Applicant's name proposes, for its part, an active engine noise control device. The control is called "active" because the elimination of the noise arises, in this device, from the control of an additional noise source positioned in the vicinity of the parts generating the airplane noise. In this document, the active noise source is formed by piezoelectric actuators of small dimensions located on the OGV, directly at the aerodynamic surfaces. These electrostatic sources generate a, preferably dipole, sound signal so as to be as similar as possible to the noise generated by the fans, this technology also being based on the principle of destructive interference.

However, the power level of the fan noise is unreachable within the constraints of integration in a standard turbojet. For this reason, it is difficult to obtain significant sound attenuation. Moreover, the considerable mass of the device prevents installing it on all the OGV. Finally this additional source of noise is difficult to finely synchronize with the noise generated by the fan spools to create destructive acoustic interference.

The prior art therefore does not supply a satisfactory solution for reducing the noise generated by air flows within an engine having a Multifan architecture, combining effectiveness in attenuating noise, adaptability to the speed of the fan spools and limited use of space.

GENERAL PRESENTATION OF THE INVENTION

According to a first aspect, the invention relates to an aircraft propulsion unit comprising a first fan spool, a second fan spool, a first air passage duct extending downstream of the first fan spool and a second air passage duct extending downstream of the second fan spool, comprising:

a control ring disposed on the first duct downstream of the first fan spool, an internal annular wall of the control ring extending into an interior space of said duct, a control unit of the control ring being configured to modify a shape of said internal wall and to vary an air passage cross section in said duct at said ring, a device for acquiring acoustic signals generated by the acoustic waves propagating downstream of the fan spools, a device for processing said acoustic signals, configured to measure dephasing between said acoustic signals and to control the control ring depending on this dephasing.

In the present invention, an aircraft propulsion unit having an architecture with multiple fan spools is equipped with an active control system for the engine noise generated by air flows, comprising a control ring of which one internal wall has a variable cross section. This control system generates very little additional bulk. It exploits the simultaneous operation of several fan spools to accomplish destructive acoustic interference between the acoustic waves downstream of these fans. For example, for an engine comprising two fan spools, one of the fan rotors is used as a counter-noise for attenuating the acoustic waves produced by the air flow of the other fan rotor.

A duct extends downstream of each fan spool, in which an acoustic wave produced by the air flows can propagate when said fan spool is in operation. The propagation of the acoustic wave in such a duct can be interpreted as acoustic lobes rotating on the circumference of the duct. The engine noise thus generated can be decomposed into wide-band noise and line noise, and can be propagated upstream or downstream. The invention can act on the line noise radiated downstream of the fan spools, by acting on the dephasing of the corresponding acoustic modes.

A local variation of the passage cross section of the air in the duct, at the control ring, allows the speed of flow of the air to be locally varied. By creating a speed differential between the flow in the first duct and flow in the second duct, it is possible to control the dephasing between the acoustic waves circulating in the two said ducts, and to generate destructive acoustic interference.

Advantageously but without limitation, the propulsion unit disclosed earlier can have the following additional features:

the control unit of the control ring is adapted so that the modification of the air passage cross section at the ring creates the destructive interference between the acoustic waves downstream of the fan spools;

the device for acquiring acoustic waves is formed by a plurality of microphones, including at least two microphones disposed downstream of the fan spools at two different axial positions at least in a longitudinal extension direction of the ducts;

the plurality of microphones comprises microphones disposed on the internal wall of each duct downstream of a fan spool and/or microphones disposed along the internal wall of a confluent nozzle downstream of a junction between the ducts;

the first duct and the second duct lead, downstream of the first and second fan spools, to a confluent nozzle at a junction, the plurality of microphones being disposed along an internal wall of the nozzle after the junction of the ducts;

all of the ducts downstream of the fan spools are equipped with control rings to adjust dephasing;

the device for processing acoustic signals is configured to calculate a spectrum for each acoustic signal depending on a frequency of rotation of the fan spools, and to compare the spectra obtained to measure the dephasing between the acoustic signals;

a control ring is formed by a casing with a flexible wall of variable radius, an internal cavity of the casing being connected to a pressure source with a variable flow rate, the corresponding air passage cross section being controlled by said flow rate;

a control ring is formed by a casing with a flexible wall of variable radius, a temperature source which can cause the temperature within an internal cavity of the ring to vary, thus causing the corresponding air passage cross section to vary by thermal dilation;

a control ring comprises a mechanical part in the periphery of the corresponding duct, the ring being configured to allow the adjustment of a radius of the ring by a stepping motor, to cause the corresponding air passage cross section to vary;

the air passage ducts downstream of the fan spools lead at a junction to a confluent nozzle, said nozzle being able to have a circular or oval outlet cross section and have an axis of symmetry of revolution.

Finally, very advantageously and without limitation, each fan spool comprises a set of fan rotor blades of which each blade is distant by a predetermined blade angle from its consecutive blade, the predetermined blade angle being the same for all the fan spools, and at least two sets of fan rotor blades of two fan spools are adjusted to be dephased from one another by an optimal blade dephasing angle throughout the engine operating range, the measurement of said optimal blade dephasing angle being determined so as to create the destructive interference between the acoustic waves downstream of the fan spools.

An aircraft propulsion unit according to this variant is configured to implement passive control of the noise.

Control, by means of the control ring(s), of the variation of air passage cross section within one or more ducts downstream of the fans, is configured to correct the variations in dephasing between the acoustic waves, with respect to the optimal dephasing which corresponds to the initial offset configured between the sets of blades of the fans.

A propulsion unit according to this last variant has, optionally, a device for processing acoustic signals which is configured to control the variation of volume of the cavity of the control ring(s) so as to correct variations in dephasing between the acoustic waves, with respect to the optimal blade dephasing angle.

GENERAL PRESENTATION OF THE FIGURES

Other features, aims and advantages of the invention will be apparent from the description that follows, which is purely illustrative and not limiting, and which must be read with reference to the appended FIGS. 1 and 2 already introduced above, as well as the other following appended drawings.

DESCRIPTION OF PARTICULAR EMBODIMENTS

In all that follows, a two-spool aircraft engine is considered, having an architecture of the Multifan type, equipped with an active control device for airplane noise generated by the fan spools which will be described hereafter. This engine is of the double flow type, comprising a secondary cold flow accelerated by the fan spools and a primary hot flow burned in a combustion chamber.

This engine 1 has two fan spools 2a and 2b joined to the low-pressure spool of the shaft by the same transmission system. However, the noise control device which will be described hereafter could also be used with an engine including more than two fan spools, provided that the air flows downstream of said spools can combine and that destructive interference can be accomplished to attenuate noise.

Figure 3:
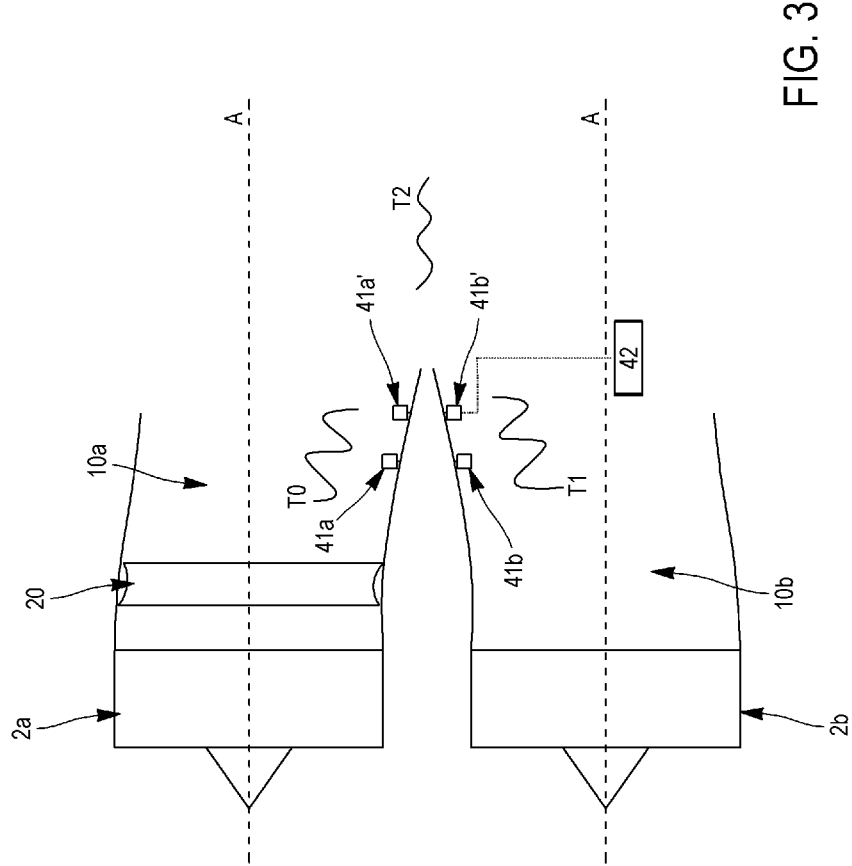
FIG. 3 shows schematically the ducts downstream of the fan spools of a Multifan engine according to a first embodiment, comprising an active system controlling dephasing between the acoustic waves downstream of the fan spools.

FIG. 3 shows schematically a two fan spool engine equipped with an active device for controlling the engine noise according to a first embodiment.

In this first system, the two fan bodies 2a and 2b are distinct but of substantially identical design, and each fan spool 2a and 2b leads to a duct (or downstream jet) 10a and 10b respectively. The two ducts 10a and 10b do not themselves lead to a common nozzle, but lead directly to the open air or to the exterior. They can have constant cross sections over their length prior to installation of the noise control device, or be of variable section, convergent or divergent.

Preferentially, but not necessarily for the implementation of the control device which will be described hereafter, it is sought to create a predetermined optimal dephasing $D_a$ between the respective sets of fans of the two fan spools 2a and 2b, so as to obtain two acoustic signals in phase opposition at the outlet of the two fans.

Figure 1:
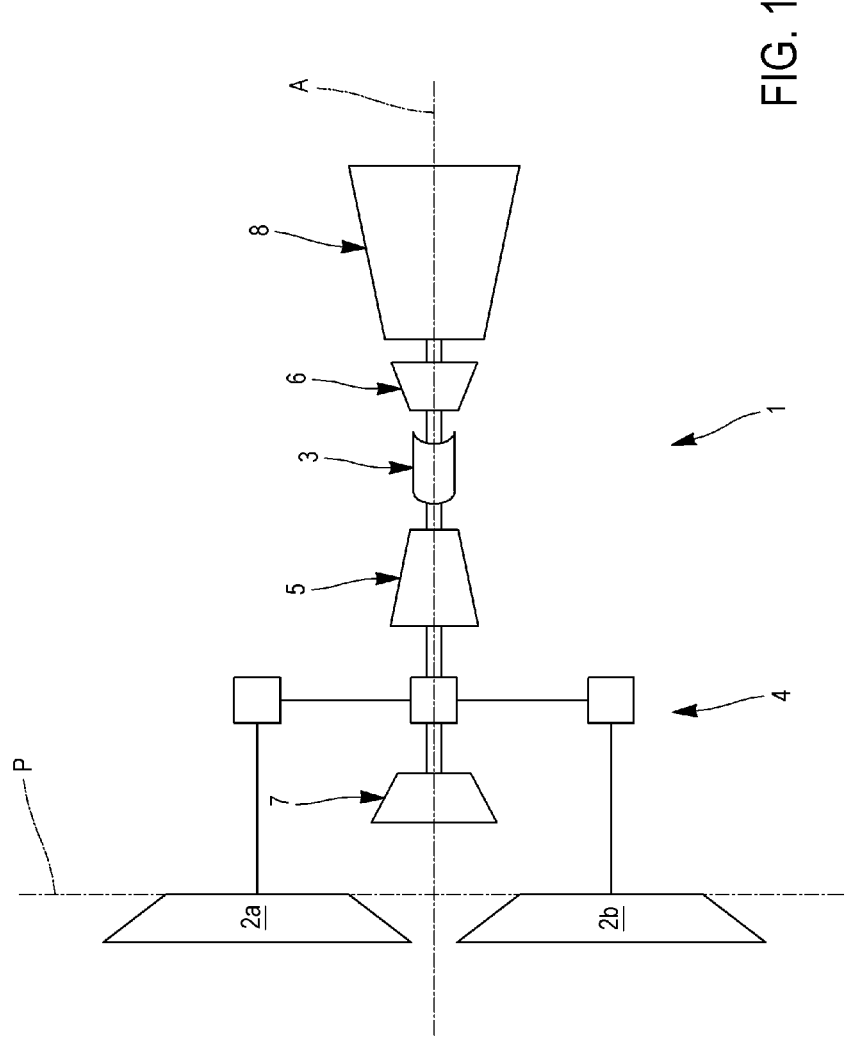
Figure 4:
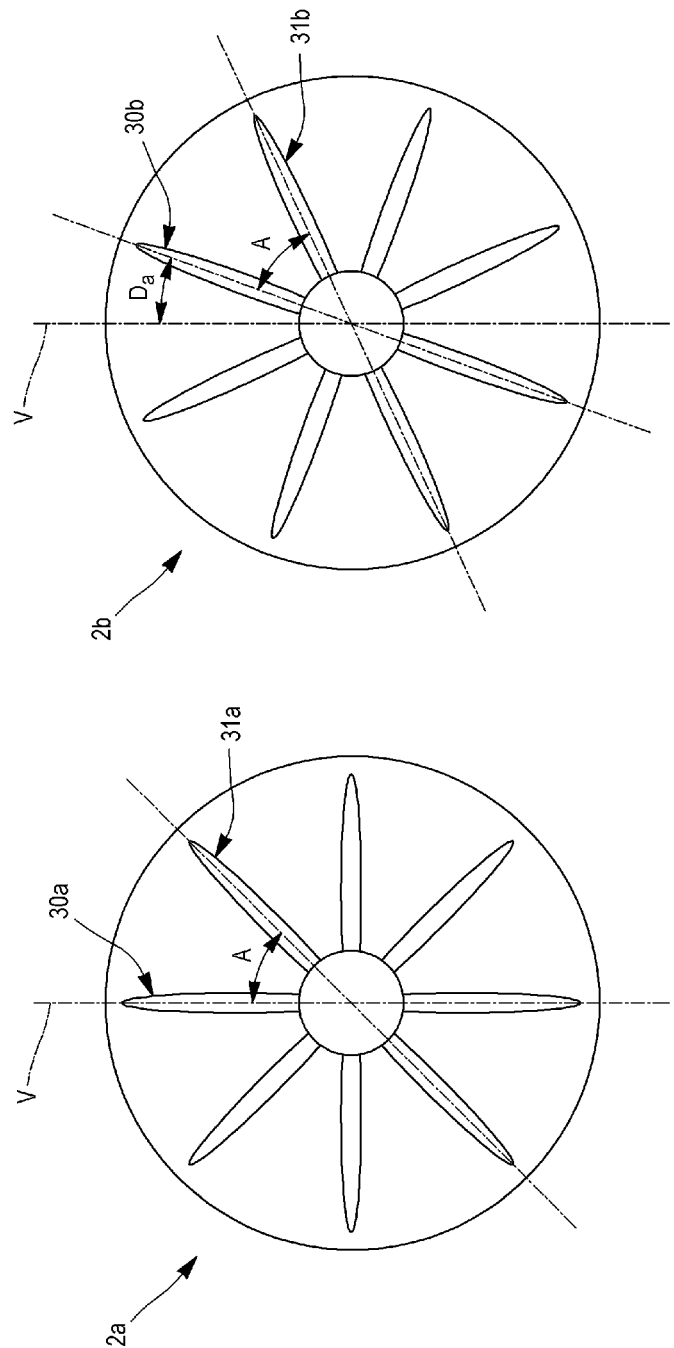
FIG. 4 is a front view of two fan spools of a turbojet with a Multifan architecture, like that of FIG. 3, of which the fan blades accomplish passive control of dephasing between the acoustic waves.

FIG. 4 shows schematically the desired configuration for the fan blades of the engine shown in FIG. 3. The two fan rotors 2a and 2b are shown there in front view, along the plane P of FIG. 1. The design of the fans 2a and 2b thus allow the implementation of a system of passive noise control, which complements the active control system which will be described hereafter, the latter active control system is based on the use of a control ring of variable cross section.

However, the active control system and the passive control system can be deployed independently of one another in an engine with a Multifan architecture. An optimal configuration in terms of airplane noise attenuation is accomplished when the two control modes are used in association.

Returning to FIG. 4, the first fan rotor 2a is provided with a set of blades in which two successive blades are denoted 30a and 31a in the figure. Likewise, the second fan rotor 2b, of identical design to the fan rotor 2a, has the same set of blades comprising two successive blades 30b and 31b.

The angle A which exists between the blades 30a and 31a is the same measurement as the angle A' which exists between the blades 30b and 31b, the fans 2a and 2b having identical design. A vertical V is marked in the two fans 2a and 2b. The second set of blades is dephased by an optimal dephasing angle $D_a$ with respect to the first set of blades.

The measurement of the optimum dephasing angle $D_a$ between the two sets of blades shown here depends in particular on the expected engine speed, and can be known based on engine tests at different speeds. A relation between the expected engine speed and the measurement of the optimal dephasing angle can be obtained with nomograms. The desired dephasing can then be accomplished by indexing the fan blades judicially when assembled into the turbojet.

In relation to FIG. 3, the active noise control device comprises a control ring 20, disposed on an interior wall of the duct 10a downstream of the fan spool 2a, and a set of microphones, 41a, 41a', 41b, 41b' capturing the acoustic waves passing in the ducts 10a and 10b. It should be noted that the active control system could comprise more microphones, or possibly a single microphone, per duct. Said microphones form a device for acquiring acoustic signals.

Shown in addition in FIG. 3 is a device 42 for processing acoustic signals acquired by the microphones 41a, 41a', 41b, 41b', configured to measure a dephasing D and control the control ring 20 depending on the dephasing D. Only the connection of the device 42 with the microphone 41b' is shown in FIG. 3; however, the device 42 comprises a connection with each of the microphones.

Interactions between the control ring 20, the microphones 41a to 41b', and the processing device 42 (a processor for example) which can communicate according to any suitable protocol with the elements of the ring 20 and with the microphones 41a to 41b', ensure the control of the control ring 20 according to the modalities described hereafter, to cause the perimeter of the control ring to vary and therefore to vary the free surface for the passage of the air flow, or air passage cross section.

In all that follows, when an air (or acoustic wave) passage cross section in a duct or in a nozzle is considered, at the control ring, it is the minimal surface area of the interior space of the duct or of the nozzle on a section of the duct or nozzle, obtained with a section plane locally perpendicular to the axis of the duct or of the nozzle that is meant.

Moreover, the fan spools 2a and 2b being identical, as are the ducts 10a and 10b, and the fan spools 2a and 2b being controlled here to maintain identical speeds during the entire operation of the engine 1, the air flows generated by the fans, and in particular by the movement of the fan rotor blades, allow acoustic waves T0 and T1 to propagate respectively within the ducts 10a and 10b which theoretically have identical amplitude and frequency. The waves T0 and T1 are shown schematically here as sinusoids.

Figure 2:
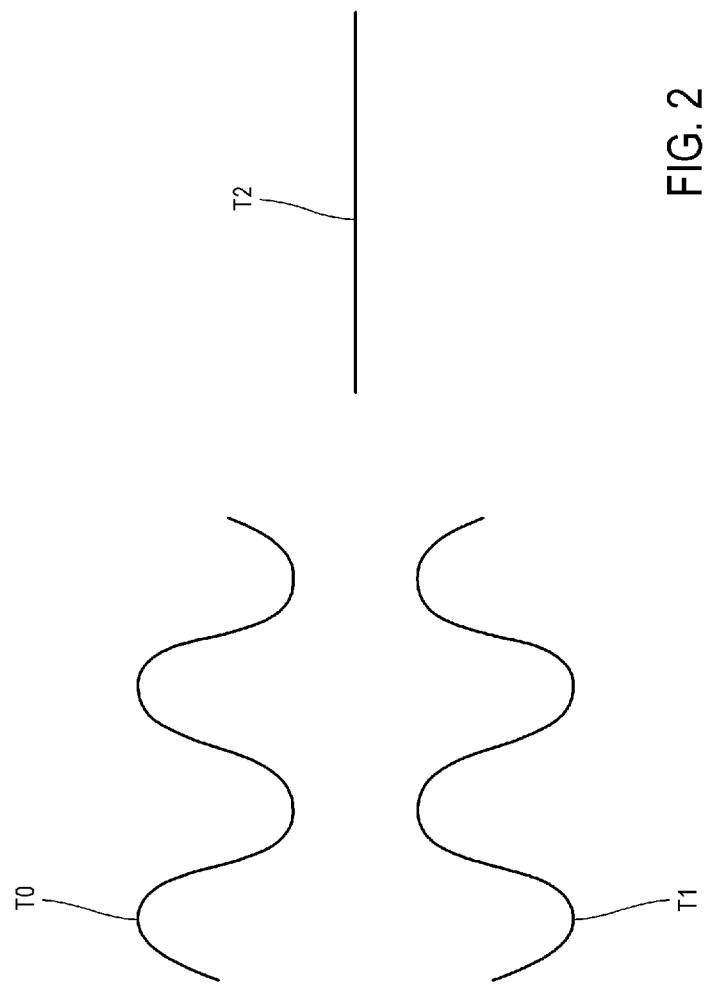

The action of the control ring allows, by the local reduction of passage cross section of the waves downstream of the fan 2a, a local modification of the propagation of the wave T0, while the propagation of the wave T1 downstream of the fan 2b is unaffected. This causes a dephasing of the wave T0 relative to the wave T1. Furthermore, in that these two acoustic waves theoretically have the same amplitude and the same frequency, dephasing can be well chosen to accomplish destructive acoustic interference between the two waves, in conformity with the principle illustrated by FIG. 2.

Figure 5:
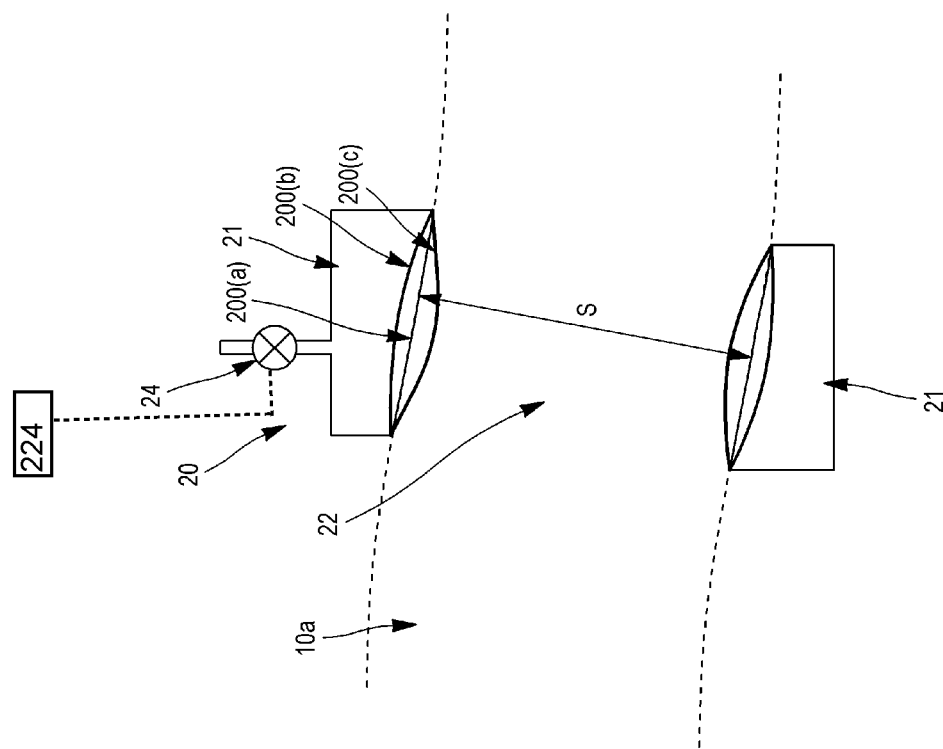
FIG. 5 is a schematic view of a control ring usable within an active anti-noise control system, for example in any one of the embodiments illustrated by FIGS. 3 and 6.

FIG. 5 illustrates the detail of a control ring 20 according to one embodiment based on pressure variations within an internal volume of the ring. In this embodiment, the ring 20 is formed by a casing with flexible walls of variable radius, having an internal cavity 21 of substantially toroidal shape. This cavity 21 situated between the walls of the casing, which are movable, provides a central passage 22 which a circular shape for example, the surface area of said central passage 22 corresponding to an air passage cross section S. The cross section S therefore constitutes a passage space for air flows downstream of the fan spool 2a.

The air passage cross section S is variable, depending on the position of the internal wall 200 of the casing. This annular wall extends in the interior space of the duct 10a, and is therefore exposed to the passage of air downstream of the fan 2a. For example, the control ring 20 can be mounted in the interior of the duct 10a, so that the external wall of the casing is in contact with an internal wall of the duct 10a, and the inner wall 200 is in the open air.

Furthermore, the cavity 21 of the ring 20 is in fluid communication with a variable flow rate pressure source 24. This pressure source 24 is controlled electronically by a processing device 224. Depending on the pressure thus controlled in the interior of the casing, the internal wall can have its shape modified. In FIG. 5, the wall 200 is in a rest position 200(a) if the pressures in the casing and in the interior space of the duct 10a are substantially equal, in a position 200(b) if the pressure imposed by the source 24 is reduced with respect to the pressure at rest, and in a position 200(c) if the pressure imposed by the source 24 is increased with respect to the pressure at rest. The processing device which controls the pressure source 24 also communicates with the microphones 41a, 41a', 41b, 41b'.

Said processing device processes the acoustic signals acquired in real time by the microphones. An acoustic spectrum is calculated for each acoustic signal, depending on a frequency of rotation of the fan spools. The spectra obtained reveal acoustic modes for the propagation of the air flow downstream of the fan spools 2a and 2b, with a certain dephasing. In theory, if the fan spools 2a and 2b were perfectly synchronized and exactly dephased by the optimal dephasing $D_a$ throughout the engine speed range, and if all the geometry of the elements of the engine were identical between the two ducts, there should not exist any dephasing during the recombination of the waves T0 and T1. But comparison of the acoustic spectra can in practice highlight a deviation with respect to the optimal dephasing $D_a$, which requires readjustment.

Depending on the measured dephasing, the processing device calculates the variation of the cross section S required for generating a dephasing of the acoustic wave downstream of the fan spool 2a (or communicates with a separate entity carrying out this calculation), so that the recombination of the acoustic waves T0 and T1 downstream of the fans 2a and 2b gives the best possible destructive interference for reducing the airplane noise. The system state which would be obtained if the geometry of the ducts 10a and 10b were perfectly identical to each other, and if the fan spools 2a and 2b remained permanently at the same speed and dephased exactly by the optimal dephasing $D_a$ is then approached. By approaching an exact phase opposition between the acoustic signals T0 and T1, it is possible to create a particularly effective noise reduction system, the acoustic signal being cancelled locally.

To connect the measured dephasing (difference with respect to the optimal dephasing $D_a$) which needs to be compensated, with a necessary variation for the cross section S, it is desirable to have a model of the propagation of the wave T0. Nomograms, obtained from engine tests at different speeds, can connect the desired dephasing and the variation of the air passage cross-section in the duct, depending on thermodynamic parameters, engine speed parameters or other parameters which can impact the propagation of acoustic waves downstream of the fan spools. As an alternative, it is possible to create active closed-loop control of the air passage cross section in the duct. Knowing the variation in cross section necessary for readjusting the mutual dephasing of the waves T0 and T1, it is easy to determine the variation of pressure necessary for the volume contained in the casing of the control ring 20, so that the wall 200 is deformed to obtain the desired cross section S.

Here, the inlet and the outlet of the air contained in the internal space 21 are equipped with valves, not shown in FIG. 4, which allow controlling the pressure in the interior of the ring 20. Furthermore, the pressure source can come either directly from the air outlets already provided for in the engine architecture, or from a pressure source external to the engine operation. This pressure source can be accomplished according to all modalities known to a person skilled in the art which are compatible with an engine with a Multifan architecture and which can correspond to the bulk constraints.

Preferably, for a control ring operating with pressure variations of an internal volume, it is appropriate to take care not to cause separation of the fan rotor blades, by excessive pressure imposed within the internal volume. An overpressure flap can be provided at the air circulation of the control ring to avoid this phenomenon.

Alternatively, rather than have the air passage cross section provided by the control ring be based on variations of pressure, it is possible to vary the temperature within the internal space of the ring to cause said cross section to vary due to thermal dilation.

It is also possible to consider embedding, in the internal space of the ring 20, for example around the internal wall 200 of the ring, a mechanical part with a variable-radius circular shape, controlled mechanically by the action of a stepping motor. In this case, the control of the air passage cross section is mechanical and direct.

Figure 6:
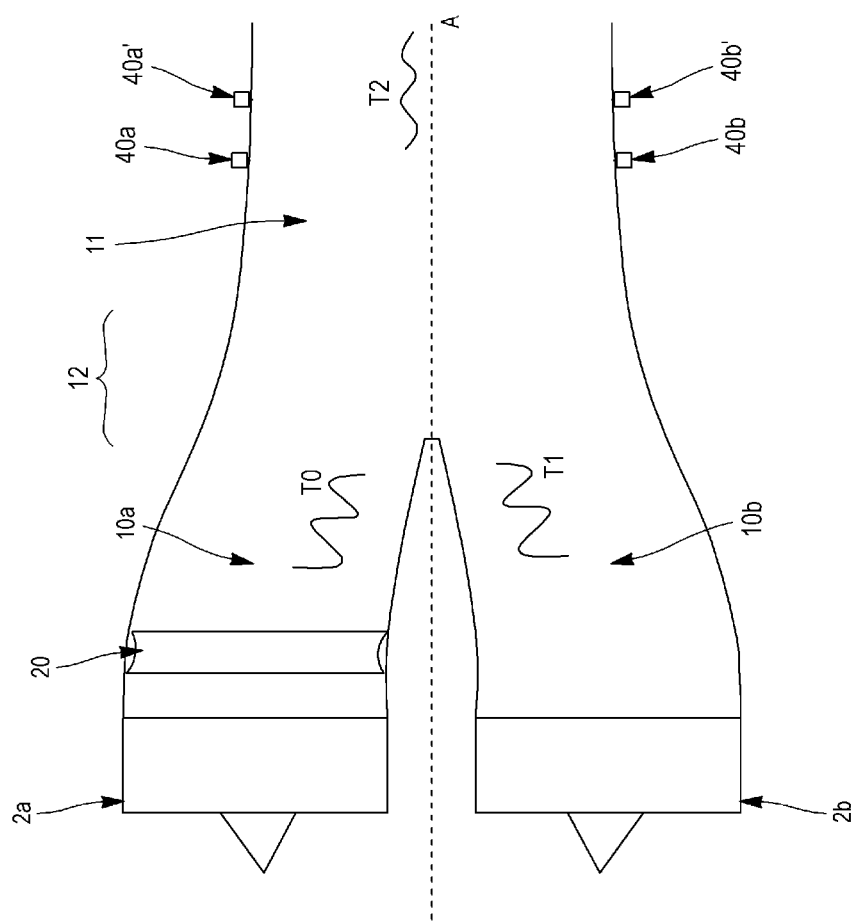
FIG. 6 shows schematically the ducts downstream of the fan spools of a Multifan engine according to a second embodiment, comprising an active system for controlling dephasing between the acoustic waves downstream of the fan spool.

FIG. 6 shows schematically an engine with a Multifan architecture with two fan spools equipped with an active airplane noise control device according to a second embodiment.

Here, the fan spools 2a and 2b have substantially identical designs, and each fan spool 2a and 2b leads respective to a duct (or downstream jet) 10a and 10b as in the first embodiment. The two ducts 10a and 10b lead into a common nozzle 11, at a junction 12 between the ducts 10a and 10b. As in the first embodiment, a control ring 20 is positioned here on one of the two ducts downstream of one of the two fans. In FIG. 6, it is the duct 10a, downstream of the fan 2a, which is equipped with a control ring 20.

The active noise control device of this second embodiment comprises a set of microphones 40a, 40a', 40b, 40b' disposed on an interior wall of the nozzle 11, hence after recombination of the ducts 10a and 10b. The microphones are disposed downstream of the junction 12. Here the acoustic spectrum of an acoustic signal T2 recombined from signals T0 and T1 propagating downstream of the two fan spools is therefore measured directly. The operation of the control ring 20, and the control of the air passage cross-section depending on the acquired acoustic signals, are identical in this second embodiment and in the first embodiment of FIG. 3.

Although, in the two embodiments described previously, a single control ring 20 is implemented, the differential of propagation of the acoustic waves at the origin of the dephasing can be distributed between the downstream ducts, with several downstream ducts equipped with control rings, up to one ring per duct. It is also possible to consider installing several control rings in series on a single duct if necessary. For an engine with a Multifan architecture having a number of fan spools strictly greater than 2, the implementation of an active noise control is possible with a single control ring disposed on the downstream duct of a single fan spool, or alternately, with several control rings, up to one ring per duct.

The invention claimed is:

1. An aircraft propulsion unit comprising:
    a first fan spool;
    a second fan spool;
    a first air passage duct extending downstream of the first fan spool;
    a second air passage duct extending downstream of the second fan spool;
    a control ring disposed on the first air passage duct downstream of the first fan spool, an internal annular wall of the control ring extending into an interior space of the first air passage duct;
    a processor configured to modify a shape of said internal annular wall and to vary an air passage cross section of the first air passage duct at the control ring and;
    a device for acquiring acoustic signals generated by acoustic waves propagating downstream of the first fan spool and the second fan spool,
    wherein the processor is further configured to measure dephasing between the acoustic signals,
    wherein the processor is further configured to control the control ring depending on said dephasing.

2. The aircraft propulsion unit according to claim 1, wherein the processor configured so that the modification of the air passage cross section of the first air passage duct at the control ring creates destructive interference between the acoustic waves propagating downstream of the first fan spool and the second fan spool.

3. The aircraft propulsion unit according to claim 1, wherein the device for acquiring acoustic signals is formed by a plurality of microphones, comprising a first microphone and a second microphone respectively disposed downstream of the first fan spool and downstream of the second fan spool, the first microphone and the second microphone being at different axial positions along a longitudinal extension direction of the first air passage duct.

4. The aircraft propulsion unit according to claim 3, wherein the device for acquiring acoustic signals comprises a third microphone disposed on an internal wall of the first air passage duct, and a fourth microphone disposed on an internal wall of the second air passage duct.

5. The aircraft propulsion unit according to claim 3, wherein the first air passage duct and the second air passage duct lead, downstream of the first fan spool and the second fan spool, to a confluent nozzle at a junction of the first air passage duct and the second air passage duct, the first microphone and the second microphone being disposed along an internal wall of the confluent nozzle, downstream of the junction of the first air passage duct and the second air passage duct.

6. The aircraft propulsion unit according to claim 1, wherein the second air passage duct is equipped with a second control ring which is controlled by the processor to adjust an air passage cross section of the second air passage duct at the second control ring depending on the dephasing.

7. The aircraft propulsion unit according to claim 1, wherein the control ring comprises a casing, and the inner annular wall of the control ring comprises a flexible wall of variable-radius, a cavity in an interior of the casing being connected to a pressure source with a variable flow rate, the air passage cross section of the first air passage duct being controllable as a function of said variable flow rate.

8. The aircraft propulsion unit according to claim 1, wherein the control ring comprises a casing with a flexible wall of variable radius, and a temperature source which can cause a temperature within an internal cavity of the casing to vary, and cause the air passage cross section of the first air passage duct to vary by thermal dilation.

9. The aircraft propulsion unit according to claim 1, wherein the control ring comprises a mechanical part in a periphery of the first air passage duct, the control ring being configured such that a radius of the control ring is adjustable by a stepping motor, to cause the air passage cross section of the first air passage duct to vary.

10. The aircraft propulsion unit according to claim 1, wherein the processor said acoustic signals is configured to calculate a spectrum for each acoustic signal depending on a frequency of rotation of the first fan spool and the second fan spool, and to compare the spectra obtained to measure the dephasing between the acoustic signals.

11. The aircraft propulsion unit according to claim 1, wherein the first air passage duct and the second air passage duct lead to a confluent nozzle at a junction.

12. The aircraft propulsion unit according to claim 1, wherein the first fan spool and the second fan spool each comprises a respective set of fan rotor blades wherein each fan rotor blade is distanced by a predetermined blade angle from an adjacent fan rotor blade,
    the predetermined blade angle being the same for the first fan spool and the second fan spool,
    wherein the sets of fan rotor blades are adjusted to be dephased from one another by an optimal blade dephasing angle throughout an engine operating range, and
    a measurement of said optimal blade dephasing angle being determined so as to create destructive interference between the acoustic waves propagating downstream of the first fan spool and the second fan spool.

13. The aircraft propulsion unit according to claim 12, wherein the processor is configured to control a variation of volume of a cavity of the control ring so as to correct variations of dephasing between the acoustic waves, with respect to the optimal blade dephasing angle.

* * * * *